Patented Dec. 1, 1953

2,661,291

UNITED STATES PATENT OFFICE 2,661,291

ANTIDIFFUSION DIAZOTYPES HAVING TETRAZO DIPHENYLS AS THE LIGHT SENSITIVE AGENT

Sam Charles Slifkin, Binghamton, N. Y., assignor to General Aniline & Film Corporation, New York, N. Y., a corporation of Delaware No Drawing. Application January 19, 1949, Serial No. 71,766

10 Claims. (Cl. 95—6)

This invention relates to diazotype photo-reproduction media and more particularly to the use of certain tetrazo derivatives of aromatic amines having two diazotizable amino groups as the light sensitive element of the diazotype material.

The diazotype process, as is well known, involves the treating of a carrier or base, usually paper which may be either opaque or transparentized, or film of the cellulose ester or cellulose ether type, with a sensitizing composition containing a diazo compound as the light sensitive element. This treated base is exposed to actinic light through a pattern and a positive reproduction of the original obtained by development of the undecomposed diazo compound under the protected portions of the pattern, by means of alkaline coupling with an azo dye coupling component. The azo dye coupling component used for development of the image may be contained in an alkaline developing solution, as is the case in the so-called wet development or one-component process. In the dry development or two-component diazotype process, the sensitizing composition with which the base material is treated contains both the diazo compound and the azo coupling component. Here, the azo dye image is formed after exposure of the sensitized material by subjecting the exposed material to the action of alkaline vapors such as ammonia vapors. The diazotype photosensitive material for the two-component process must have good stability against precoupling, so that the sensitized layers may be stored for reasonable periods of time under average conditions of temperature and humidity prior to use.

The requirements of the diazotype art set rather rigid and exacting standards for the selection of the dye components to be used in the sensitizing composition for the production of a diazotype photoprinting material. The dye components must be capable of producing dyes which have good permanency and substantivity for the base material. The dyes upon development to produce the desired image must have good wash fastness properties so that the image will not be blurred by bleeding of the dye into the background. They must also be fast to light and to offset. The diazo compound used in the composition as the light sensitive agent must be highly sensitive to the action of actinic light and must be particularly responsive to light from a source rich in the ultraviolet light band of from 3600 Å to 4200 Å as are the light sources generally employed in the printing apparatus used for diazotype reproduction. The sensitivity to light of the diazo compound must be of such an order that complete decomposition of the diazo compound is effected in the areas exposed to light to a form or product which will no longer react with a coupling component to produce an azo dye and such action must take place in a short period of exposure. The shorter the period of exposure or the faster the diazo compound is to the action of light, the more suitable it is for commercial usage. In two-component processes the sensitizing materials must also be stable to precoupling or spontaneous coupling prior to use and against oxidation. Lack of stability to precoupling and oxidation results in an overall production of discoloration in the background of the ultimate print and consequent loss of contrast between the image and the background.

In all positive photo-printing processes, particularly where final copies are being made, it is highly desirable to produce a copy which will have a distinctive color preferably a dark shade on a clear background. The sensitivity of the diazo compound to actinic light, and in the case of two-component diazotypes, the stability of both the diazo compound and the azo component against precoupling are the principal contributing factors to the production of a clear background. Oxidation of the coupling component either before or after exposure and development and oxidation of the phenolic product or products of the diazo compound also contribute to the formation of discoloration in the background.

In view of the rigid standards to which the components used in diazotypes must comply, relatively few classifications of diazo compounds have found their way into commercial usage. For all practical purposes those diazo compounds which are used commercially have been selected from the diazo derivatives of aminonaphthol sulfonic acids or so-called diazo anhydrides and the N-alkyl substituted p-phenylenediamines of the benzene series. Although satisfactory in many respects, these diazo compounds are subject to diffusion in the sensitized but unprocessed diazotype materials, and the diffusion or bleeding of the final azo dye images produced therefrom. This defect of diazotypes has been the subject of considerable study, but the problem has been difficult to solve. An increase in the complexity and size of the diazo molecule and consequently of the resulting dye molecule would seem to provide a basis for arresting tendencies to diffuse. However, increasing the complexity and size of the diazo molecule usually introduces collateral defects. The solubility of the component in some cases is rendered too low for practical use and the diazo structure is so altered by the growth of the molecule that the desired light sensitivity characteristics are impaired. This is particularly true of tetrazo derivatives of diazotizable diamines having large molecules. The tetrazo compounds generally are of low sensitivity to light and therefore require slow printing speeds. When they are binuclear their solubility is quite low. Also their coupling potential or rate of reaction with the coupling components is generally very fast, rendering it difficult to secure sensitized two-component compositions having good keeping qualities in the unprocessed form.

In my U. S. P. 2,632,703, granted March 24, 1953, I have described a class of tetrazo compounds which are extremely light sensitive, have acceptable coupling energy, and produce dyes of a deep shade having excellent wash fastness properties. I have now found an additional class of tetrazotized diamines related to the class described in said U. S. patent by structural characteristics. The members of this new class of tetrazo compounds are extremely light sensitive and have good solubility characteristics. They are fast to precoupling, have acceptable coupling rates and produce deep colors having excellent wash fastness properties. They are also fast to diffusion prior to exposure and development, and produce dyes which have a high resistance to diffusion and bleeding in the presence of conditions such as excessive heat or moisture which generally produce bleeding of the final dyes. The new class of compounds may be considered as derived by diazotization from members of the class of amines which may be represented by the following general formula:

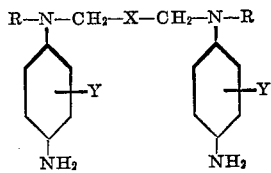

wherein X is a radical of the class consisting of

—(CH₂)ₙ—, —(CH₂)ₙ'—O—(CH₂)ₙ'—,
—(CH₂)ₙ'—CHOH—(CH₂)ₙ'—, and

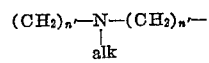

R is a member of the class consisting of H, alkyl and hydroxyalkyl; n is an integer from 0–8; n' is an integer from 0–4; and Y is a member of the class consisting of H and alkyl.

Typical of this class of compounds is N,N'-bis[4-amino-2-methyl-phenyl]ethylene diamine, which may be prepared by reduction of the corresponding nitroso compound (Beil., vol. 13, p. 147). Further examples of particular tetrazo compounds of this class are as follows:

1. N,N' - bis[4 - amino - 2 - methyl - phenyl] - ethylene diamine

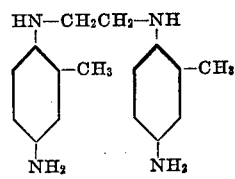

2. N,N' - bis[4 - amino - 3 - methyl - phenyl] - ethylene diamine

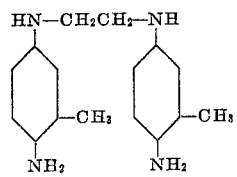

3. N,N' - bis[4 - amino - phenyl]ethylene diamine

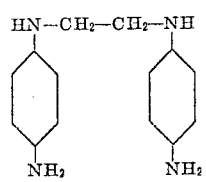

4. Bis[N,N' - hydroxyethyl - N,N' - p - amino - phenyl]trimethylene diamine

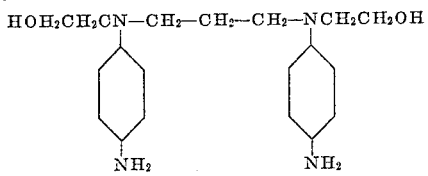

5. Bis[N,N' - methyl - N,N' - p - amino - phenyl] - β - hydroxy propylene diamine

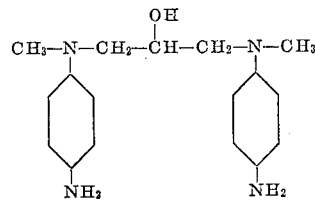

6. B,B' - bis[N,N' - methyl - N,N' - p - amino - phenyl]diethylether diamine*

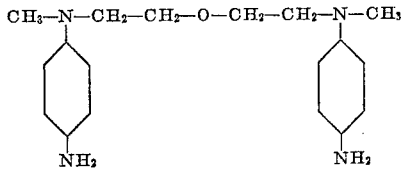

*or oxydiethylene-bis[p-amino-N-methyl aniline]

7. N,N',N'' - trimethyl - N,N' - di(p - amino - phenyl) - diethylene - triamine

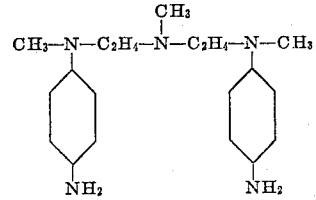

8. Bis[N,N' - hydroxyethyl - N,N' - p - amino - phenyl]decamethylene diamine

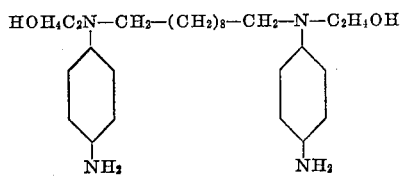

The bisnitro derivatives from which these diamines are derived by reduction are generally obtained by reacting the dichloro derivative of the hydrocarbon, hydroxy hydrocarbon, or ether having the two chlorine atoms on two terminal carbons with two mols of the p-amino nitro benzene, the latter having been first alkylated or hydroxy alkylated on the amino group if the desired compound has such a substitution. The amino nitrogen may carry a solubilizing substituent such as hydroxyalkyl where the X unit does not contain any solubilizing group. On the other hand, if the R substituent does not effect increased solubility then X may be a radical which does.

In the case of the compounds containing an N atom in the X unit the bisnitro derivative is obtained by reaction between one mol of the dichloro derivative of the bridge component such as nitrogen mustard

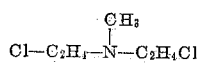

and an excess of N-alkyl aniline such as methyl aniline. The product is then nitrosated, the nitro groups always entering para to the amino group.

The tetrazo compounds derived from the amines of the foregoing class may be applied in the usual manner to any suitable support such as paper, cloth or film, such as film prepared from cellulose ethers and esters, regenerated cellulose, superpolymers and polymerization products. They may be used in any of the stabilized forms in which diazo compounds are generally recovered from the diazotization solutions prior to application to the diazotype supports. Such forms include zinc chloride, cadmium chloride, tin chloride or fluoroborate double salts, acid salts such as sulfates or chlorides of the diazo groups or the alkyl or aromatic sulfonate salts of the diazo compounds. Any compound which will function as a coupling component and which is otherwise suitable for diazotype compositions may be employed to produce the desired shade. The coupling component may be either incorporated in the coating composition to be applied to the diazotype support with the tetrazo compound as a so-called two-component system or it may be used in a developing solution as the color forming developer for a so-called one-component or wet development diazotype. Examples of preferred coupling components are:

1. Sodium salt of 2-amino-8-naphthol-3,6-disulfonic acid
2. 2,3-dihydroxynaphthalene or its 6-sulfonic acid derivative
3. β-Naphthol-3,6-disulfonic acid
4. 2,7-dihydroxy naphthalene
5. 1,7-aminonaphthol
6. 2-hydroxynaphthalene-8-biguanide
7. 1-amino-8-naphthol-3,6-disulfonic acid
8. 1-naphthol-4-sulfonic acid
9. 1-naphthol-3,8-disulfonic acid
10. Phloroglucinol
11. m-Hydroxyphenyl urea
12. Acetoacetanilide
13. 7-hydroxy-1,2-naphthimidazole
14. Cyclohexyl acetoacetamide
15. Resorcinol
16. 4,6-dichlororesorcinol
17. 3-hydroxyphenyl biguanide
18. 4-chlororesorcinol
19. 2,8-dihydroxynaphthalene-6-sulfonic acid In producing a diazotype light sensitive layer from coating solutions containing the tetrazo compounds of this invention as the light sensitive agents, the base or support material is dipped, brushed or sprayed with the sensitizing or coating solution by means known to the art, the particular type of application depending upon the carrier employed. Where paper is used as the base for the light sensitive coating, the coating solution is generally applied by using a trough and doctor blade, the paper being drawn past the trough and excess solution being scraped off with the doctor blade. The paper may also be brushed or sprayed with the coating solution. When a film material is used as the support in order to obtain proper penetration of the active agents, solvents or swelling agents are added to the coating solution and the solution is generally applied by dipping. In addition to the tetrazo compound, coupling component and impregnating and swelling solvents, the coating solution may also contain dissolved metal salts designed to intensify the dyestuff images, such as aluminum sulfate, titanium ammonium fluoride, nickel sulfate and the like, stabilizing agents such as thiourea, thiosinamine, naphthalene trisulfonic acid and the like, acids to effect complete solubility of the solid components and assist in retarding precoupling tendencies such as citric acid, tartaric acid and boric acid and hygroscopic agents such as glycol, dextrin and the like.

Although this invention will be described with reference to the two-component or so-called dry development process, i. e., development of a diazotype layer containing both the tetrazo and coupling component by contacting the exposed diazotype with ammonia vapor or vapors of other volatile alkaline materials, nevertheless the invention is also applicable to the so-called one-component or moist development process in accordance with which the solution applied to the support contains as the only dye component the tetrazo compound of the class set forth above In this process as previously indicated, the coated support is exposed and the tetrazo compound decomposed in the exposed areas in the same manner as in the case of the two-component system, but the unexposed areas are developed by contacting the light exposed diazotype with a solution of alkaline agents containing the coupling component.

The following examples will serve to further illustrate the preparation of diazotype photoprinting materials from the tetrazo compounds of this invention, it being understood that the invention is not limited to the particular materials or proportions therein described. Unless otherwise specified, the parts are by weight.

*Example 1*

Diazotype paper stock is coated with a solution containing the following material per 100 cc. of water:

2 gm. bis[N,N' - hydroxyethyl - N,N' - p - diazophenyl]trimethylene diamine (ZnCl₂ double salt)
5 gm. thiourea
5 gm. zinc chloride
2 gm. citric acid
3 gm. 2,3-dihydroxynaphthalene-6-sulfonic acid The thus coated paper upon being dried and stored for long periods of time is found to have excellent precoupling stability. It is highly resistant to diffusion of the dye components. When exposed to ultra violet light under a positive original and developed with ammonia vapors a well-defined image of the original is reproduced in a deep blue color. The wash fastness, fastness to diffusion and bleeding and light fastness of the azo dye image are excellent.

*Example 2*

Transparentized diazotype paper stock is coated with a solution containing the following material per 100 cc. of water:

4 gm. bis[N,N' - methyl - N,N' - p - diazophenyl]-β-hydroxypropylene diamine (ZnCl₂ double salt)
5 cc. ethyleneglycol
4 gm. citric acid
2 gm. boric acid
2 gm. resorcinol
5 gm. zinc chloride
5 gm. thiourea The thus coated transparentized paper upon being dried and stored for long periods of time is found to have excellent precoupling stability. It is also highly resistant to diffusion of the dye components. When exposed to ultra violet light under a positive original and developed with ammonia vapors a well-defined image of the original is reproduced in a sepia shade of high visual density. This sepia azo dye image has good actinic opacity or ultra violet light absorptive qualities. It is also characterized by the permanence of the dye image with regard to bleeding or diffusion. The sepia dye image of the original obtained in accordance with this example is therefore eminently suited for transition diazotype printing wherein the sepia diazotype image is used in an original for the production of further copies from ordinary diazotype paper or other light sensitive reproduction media.

I claim:

1. A process of producing photoprints containing azo dyestuff images which comprises exposing under a pattern to rays of ultraviolet light a light-sensitive material comprising a base having thereon a light-sensitive layer containing a light sensitive tetrazo derivative of an aromatic diamine having the general formula

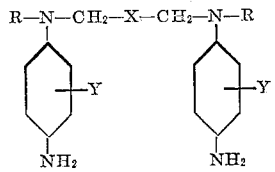

wherein X is a radical of the class consisting of —(CH₂)ₙ—, —(CH₂)n'—, —O—(CH₂)n'—, —(CH₂)n'—CHOH—(CH₂)n'—, and

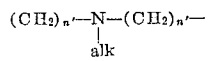

R is a member of the class consisting of H, alkyl and hydroxyalkyl; $n$ is an integer from 0-8; $n'$ is an integer from 0-4; and Y is a member of the class consisting of H and alkyl to effect decomposition of the light-sensitive tetrazo derivative where exposed, and developing the light-sensitive material by means of an alkali in the presence of an azo dye coupling component to effect coupling between undecomposed tetrazo derivative and said coupling component.

2. A light-sensitive storage stable material for the production of diazotype prints comprising a base having thereon a light-sensitive layer containing a light sensitive tetrazo derivative of bis[N,N'-hydroxyethyl-N,N' - p - amonophenyl]-trimethylene diamine having the formula

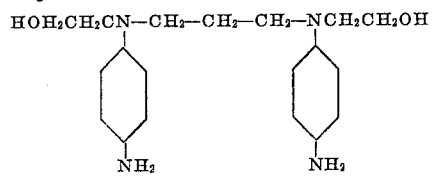

and an azo dye coupling component.

3. A light-sensitive storage stable material for the production of diazotype prints comprising a base having thereon a light-sensitive layer containing a light sensitive tetrazo derivative of bis[N,N'-methyl-N,N'-p-aminophenyl] - β - hydroxy propylene diamine having the formula

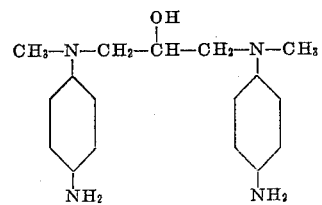

and an azo dye coupling component.

4. A light-sensitive storage stable material for the production of diazotype prints comprising a base having thereon a light-sensitive layer containing a light sensitive tetrazo derivative of bis[N,N'-hydroxyethyl-N,N' - p - aminophenyl]-trimethylene diamine having the formula

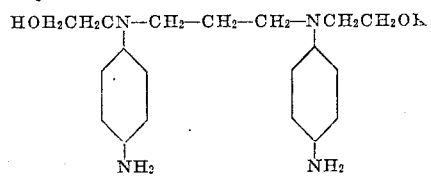

and 2,3-dihydroxynaphthalene-6-sulfonic acid.

5. A light-sensitive storage stable material for the production of diazotype prints comprising a base having thereon a light-sensitive layer containing a light sensitive tetrazo derivative of bis[N,N'-methyl-N,N'-p-aminophenyl] - β - hydroxy propylene diamine having the formula

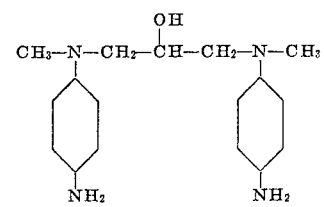

and resorcinol.

6. The process as defined in claim 1, wherein the azo dye coupling component is present in the light-sensitive layer.

7. The process as defined in claim 1, wherein the light-sensitive tetrazo compound is derived from bis(N,N' - hydroxyethyl - N,N' - p-aminophenyl)trimethylene diamine, and the azo dye coupling component is located in the light-sensitive layer.

8. The process as defined in claim 1, wherein the light-sensitive tetrazo compound is derived from bis(N,N'-methyl-N,N'-p-aminophenyl)-β-hydroxy propylene diamine, and the azo dye coupling component is located in the light-sensitive layer.

9. The process as defined in claim 1, wherein the light-sensitive tetrazo compound is derived from bis(N,N'-hydroxyethyl - N,N' - p - aminophenyl)trimethylene diamine, and the azo coupling component is 2,3-dihydroxynaphthalene-6-sulfonic acid, which is located in the light-sensitive layer.

10. The process as defined in claim 1, wherein the azo dye coupling component is resorcinol which is located in the light-sensitive layer.

SAM CHARLES SLIFKIN.

References Cited in the file of this patent

UNITED STATES PATENTS

| Number | Name | Date |
|---|---|---|
| 2,010,884 | Olpin | Aug. 13, 1935 |
| 2,196,950 | Zahn et al. | Apr. 9, 1940 |
| 2,531,485 | Von Glahn et al. | Nov. 28, 1950 |

FOREIGN PATENTS

| Number | Country | Date |
|---|---|---|
| 332,954 | Great Britain | July 29, 1930 |

OTHER REFERENCES

Spencer "Photographic Applications of Diazo Compounds," The Photographic Journal, December 1928, pp. 490–494, pg. 492 particularly cited.

Diserens—The Chemical Technology of Dyeing and printing—vol. I (1948) Pub. by Reinhold Publishing Corp., N. Y. C., pages 263–264.